US010788792B2

(12) United States Patent
Amir et al.

(10) Patent No.: US 10,788,792 B2
(45) Date of Patent: Sep. 29, 2020

(54) VISUAL SECURITY FEATURE

(71) Applicant: HP INDIGO B.V., Amstelveen (NL)

(72) Inventors: Gideon Amir, Ness Ziona (IL); Mark Sandler, Ness Ziona (IL); Shai Lior, Ness Ziona (IL); Dror Kella, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/243,895

(22) Filed: Jan. 9, 2019

(65) Prior Publication Data

US 2019/0146411 A1 May 16, 2019

Related U.S. Application Data

(63) Continuation of application No. 14/413,407, filed as application No. PCT/EP2012/063944 on Jul. 17, 2012, now Pat. No. 10,191,449.

(51) Int. Cl.
| | |
|---|---|
| *G03H 1/00* | (2006.01) |
| *B42D 25/40* | (2014.01) |
| *B44B 5/02* | (2006.01) |
| *B42D 25/328* | (2014.01) |
| *B42D 25/405* | (2014.01) |
| *B42D 25/42* | (2014.01) |
| *B41M 3/14* | (2006.01) |

(52) U.S. Cl.
CPC ........... *G03H 1/0011* (2013.01); *B41M 3/144* (2013.01); *B42D 25/328* (2014.10); *B42D 25/40* (2014.10); *B42D 25/405* (2014.10); *B42D 25/42* (2014.10); *B44B 5/028* (2013.01)

(58) Field of Classification Search
CPC ...... G03H 1/0011; B44B 5/028; B42D 25/40; B42D 25/328; B42D 25/42; B42D 25/405; B41M 3/144
USPC ....... 283/67, 70, 72, 74, 75, 81, 94, 98, 901
See application file for complete search history.

(56) References Cited

U.S. PATENT DOCUMENTS

| | | | |
|---|---|---|---|
| 4,184,700 A | 1/1980 | Greenaway | |
| 4,705,356 A | 11/1987 | Berning | |
| 4,779,898 A | 10/1988 | Berning | |
| 5,876,068 A * | 3/1999 | Schneider | ............... D21H 21/44 283/86 |
| 5,944,881 A | 8/1999 | Mehta | |

(Continued)

FOREIGN PATENT DOCUMENTS

| | | |
|---|---|---|
| CN | 1360544 | 7/2002 |
| CN | 1589206 | 3/2005 |

(Continued)

OTHER PUBLICATIONS

"Advancements in Technology Drive Holography Trends"; Foil & Specialty Effects Association; Nov.-Dec. 2010; http://www.fsea.com/article.asp?ID=125.

(Continued)

*Primary Examiner* — Justin V Lewis
(74) *Attorney, Agent, or Firm* — HP Inc. Patent Department

(57) ABSTRACT

According to one example, there is provided a visual security feature. The visual security feature comprises a security feature printed on a media. The security feature includes a security code printed on the media, and a holographic image is embossed on the printed security feature.

8 Claims, 4 Drawing Sheets

(56) References Cited

U.S. PATENT DOCUMENTS

| | | |
|---|---|---|
| 6,171,734 B1 | 1/2001 | Warner |
| 6,607,792 B1 | 8/2003 | Breger |
| 7,080,041 B2 | 7/2006 | Nagel |
| 2007/0190298 A1* | 8/2007 | Hampden-Smith .... B42D 25/29 428/204 |
| 2009/0315318 A1 | 12/2009 | Jones |
| 2010/0025475 A1 | 2/2010 | Webb |
| 2010/0027082 A1 | 2/2010 | Wiltshire |
| 2011/0031735 A1 | 2/2011 | Gerigk |
| 2013/0043670 A1 | 2/2013 | Holmes |
| 2013/0288175 A1 | 10/2013 | Chun |

FOREIGN PATENT DOCUMENTS

| | | |
|---|---|---|
| CN | 101102905 | 1/2008 |
| CN | 101484831 | 7/2009 |
| CN | 101557945 | 10/2009 |
| EP | 1650587 | 4/2006 |
| WO | WO-2006076616 A2 | 7/2006 |
| WO | WO-2008031170 A1 | 3/2008 |
| WO | WO-2011104551 | 9/2011 |

OTHER PUBLICATIONS

Torrisi, A. et al.; "Security Products: Inside the Italian Electronic Identity Card"; 2004; pp. 91-100; http://www.oecd.org/dataoecd/14/17/16692437.pdf.

\* cited by examiner

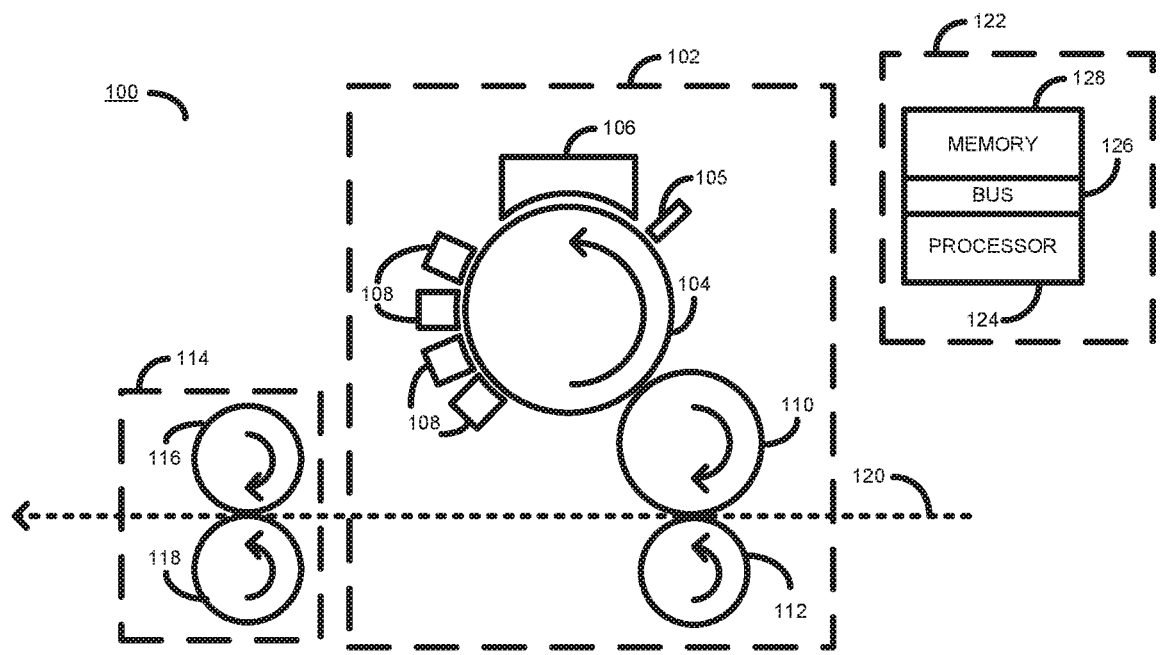
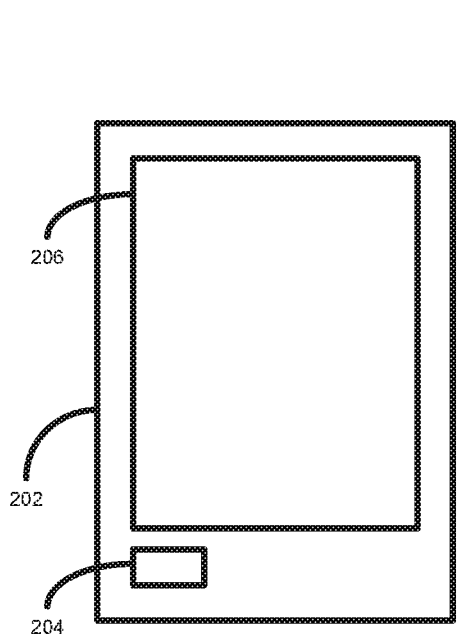
FIGURE 2a
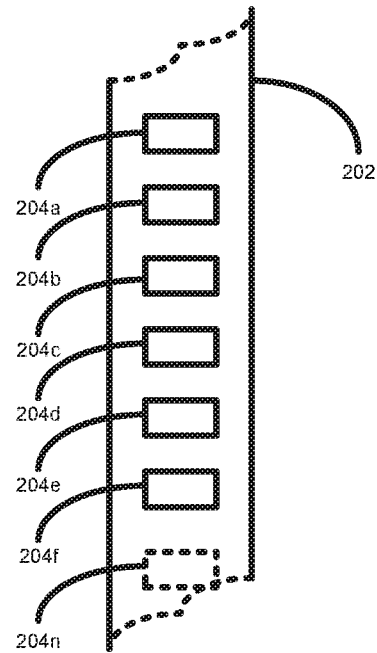
FIGURE 2b

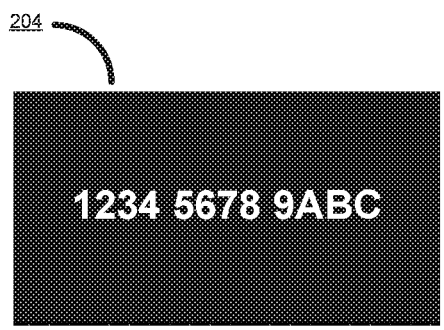
FIGURE 3a
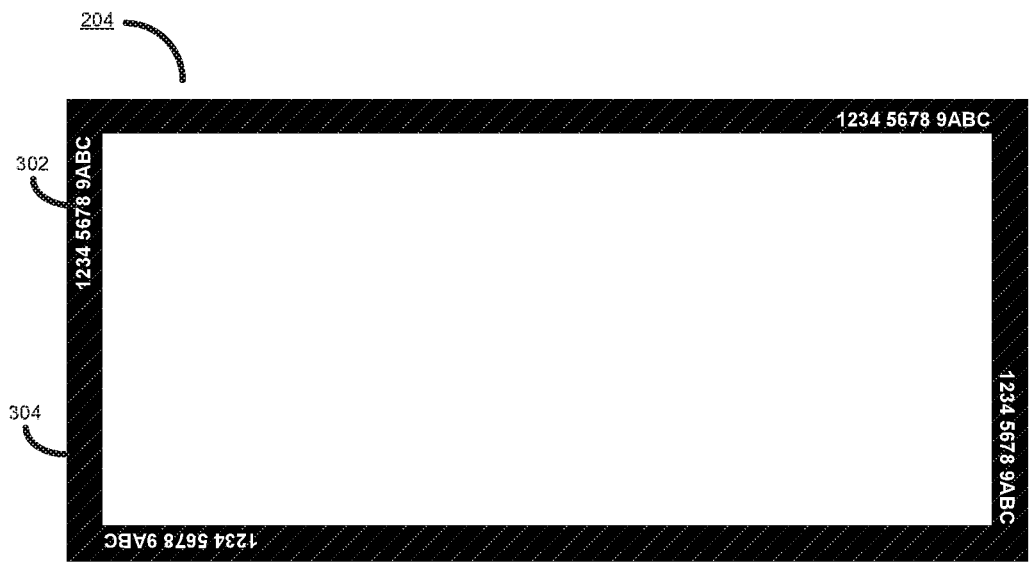
FIGURE 3b
1234 5678 9ABC
FIGURE 3c

VISUAL SECURITY FEATURE

BACKGROUND

To help distinguish authentic items from counterfeited items various visual security features may be used. For example, items such as bank cards, passports, driver's licences, digital versatile disk (DVD) films, product labels, etc. often incorporate holographic images or other optically variable devices (OVDs).

OVDs, such as holographic images, are generally hard to reproduce by counterfeiters and thus the inclusion of a known holographic image in an item enables the authenticity of the origin an item to be quickly and confidently assessed by simple visual inspection.

BRIEF DESCRIPTION

Examples, or embodiments, of the invention will now be described, by way of non-limiting example only, with reference to the accompanying drawings, in which:

FIG. 1 is a block diagram of a system for generating a security feature according to one example;

FIG. 2a is an illustration of a security feature formed on a media according to one example;

FIG. 2b is an illustration of a security feature formed on a media according to one example;

FIG. 3a is an illustration of a printed security feature according to one example;

FIG. 3b is an illustration of a printed security feature according to one example;

FIG. 3c is an illustration of a printed security feature according to one example;

DETAILED DESCRIPTION

Figure 4:
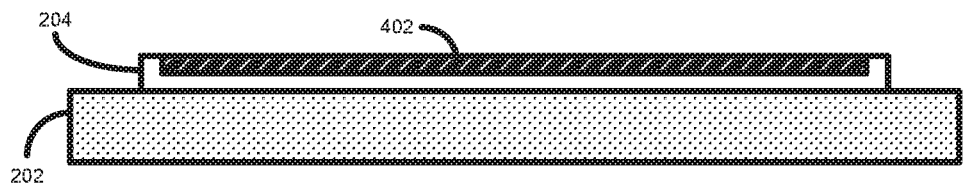
FIG. 4 is an illustration of a section view of a media on which a holographic security feature is formed according to one example.

Due to the cost and complexity of generating holographic images, many manufacturers tend to use only a single or a small number of holographic images as a mark of authenticity. For example, a manufacturer may use a single holographic image to authenticate the origin (e.g. the manufacturer) of their products, or may use different holographic images to authenticate a range of products or items. Typically holographic images are produced as stickers that may be stuck to a product or item. Such stickers may include a metallic foil or metallic layer, and may be tamper evident such that an attempt to remove a sticker results in the partial or total destruction of the sticker.

However, if a counterfeiter manages to obtain a stock of original holographic stickers, or manages to produce reasonable copies of the holographic image, the authenticity of items becomes difficult, if not impossible, to determine, at least from a simple visual inspection of a visual security feature.

Examples of the present invention, as described herein, aim to provide a visual security feature, along with a method of and a system for producing a visual security feature, that offers a level of security than conventional holographic images alone.

Referring now to FIG. 1 there is shown a system 100 for producing a visual security feature according to one example. The visual security feature comprises printed content on which is embossed an embossable optically variable device (OVD) such as a holographic image. Hereinafter the term holographic image and optically variable device is intended to refer to a holographic image or other optically variable device which is capable of being embossed on a printed security feature. In one example, a holographic image may be embossed on a printed security feature using hot embossing. In another example, a holographic image may be embossed on a printed security feature using 'cold' or ambient temperature embossing.

The system 100 comprises a printing module 102 for generating printed content and a holographic imaging module 114 for generating an optically variable device, such as a holographic image, on a portion of the printed content.

The system 100 is controlled by a controller 122. The controller 122 comprises a processor 124 that is coupled to a memory 128 through a communication bus 126. The memory 128 stores processor executable instructions that, when executed by the processor 124, controls the system 100 as described herein.

In one example, the printing module 102 is a liquid electrophotographic (LEP) printing system, such as a Hewlett-Packard Indigo digital press. The printing system 102 comprises a rotatable photo imaging plate (PIP) 104. The PIP has a photoconductor layer that is electrically charged by a charging unit 105. An imaging unit 106, such as a laser imaging unit, creates a latent image corresponding to a single colour separation on the PIP 104 by selectively discharging areas of the PIP 104 in response to data representing an image to be printed. Liquid ink, such as Hewlett-Packard ElectroInk, is then electrostatically transferred from a binary ink developer (BID) 108 containing ink of a colour corresponding to the colour separation to the charged areas of the PIP 104.

Ink transferred to the PIP 104 is then electrostatically transferred to an intermediate transfer member (ITM) cylinder 110 covered with a blanket. The blanket is heated which causes oil in the liquid ink to evaporate, leaving a thin resin film on the blanket, with the resin film comprising the image to be printed. The resin film on the blanket is then transferred to a media in a media path 120 by the application of pressure from a transfer roller 112. After printing, the resin film comprises dried, or substantially dried, liquid ink.

To form a colour image a media may remain attached to the transfer roller 112 and multiple latent images for different colour separations of the image to be printed may be formed on the PIP 104 and separately transferred to the media via the ITM 110.

In one example the printing system 102 is controlled by the controller 122 to print a security feature on a media, as shown in FIGS. 2a and 2b.

In FIG. 2a is shown an illustration of a media 202 on which a security feature 204 has been printed. In this example the security feature 204 is printed in addition to other printed content 206.

In FIG. 2b is shown an illustration of a media 202 on which a plurality of security features 204a to 204n are printed. In this example each of the printed security features 204a to 204n are different from one another and are unique or substantially unique. In this example, each printed security feature 204a to 204n may be later cut-out and applied to or incorporated into an individual item or product.

The printed security features 204 may, for example, be any suitable security feature, such as an alphanumeric code, a numeric code, or a text string. In one example each security feature has a printed security feature that is human understandable. In another example, a printed security feature may be only machine understandable, such as a bar code, a multi-dimensional bar code, or the like.

FIG. 3a shows a more detailed illustration of a security feature 204 according to one example. In this example the security feature 204 is an alphanumeric code printed as inverted or knock-out text. In this example the printed security code shows as the colour of the media on which the code is printed, since no ink marks are formed to produce the code. The surround of the code, however, is printed, in this example, using black ink, although in other examples other colour inks could be used.

FIG. 3b shows a more detailed illustration of a security feature according to another example. In this example the security feature 204 comprises a security code 302 printed in knock-out text in a frame portion 304 printed in black ink.

FIG. 3c shows a more detailed illustration of a security feature according to one example. In this example the security feature 204 comprises a security code 306 printed in black ink.

The media 202 on which the security feature has been printed is then fed along the media path 120 to the holographic imaging module 114.

The holographic imaging module 114 is configured to produce an optically variable device, such as a holographic image, on a printed security feature 204 generated by the printing system 102. In one example the holographic imaging module 114 is integrated into the printing system 100. In a further example the holographic imaging module 114 may be external to the printing system 100.

Some optically variable devices, such as holographic images, may be produced through hot embossing on a suitable thermo-plastic material. Generation of a holographic image through hot embossing involves heating a suitable thermo-plastic material to above its softening point, and embossing or stamping on the softened material using a suitable holographic image master stamp. The thermo-plastic material may then cool, or be cooled, to persistently record the embossed holographic image.

It has been realized that the properties of Hewlett-Packard ElectroInk, or liquid electrophotographic (LEP) ink, make it a suitable a thermo-plastic material for the production of holographic images through hot embossing.

In one example a holographic master image is formed on a first embossing roller 116. The holographic master image may be formed, for example, on a nickel shim using known techniques. A second embossing roller 118 forms a nip with the first embossing roller through which a media 202 on which a security feature 204 has been printed passes. In one example the printed security feature 204 may be heated prior to the media passing through the nip, for example by an infrared heater, a hot air stream, or the like. In other examples the first embossing roller 116, the second embossing roller 118, or both embossing rollers 116 and 118 may be heated. The temperature to which the media is heated may be determined based on the softening temperature of the ink used to print the printed content. For Hewlett-Packard ElectroInk the ink may be suitably heated to in the region of about 100 degrees Celsius.

In one example the holographic imaging module 114 may be controlled by the controller 122 to only emboss a holographic image on a printed security feature. This may be achieved, for example, by mechanically moving the first or second embossing roller 116 and 118 out of the media path 120 when not needed.

In another example a holographic master image may be formed on a stamp and a stamping mechanism (not shown) and heater (not shown) may replace the first and second embossing roller.

Figure 6:
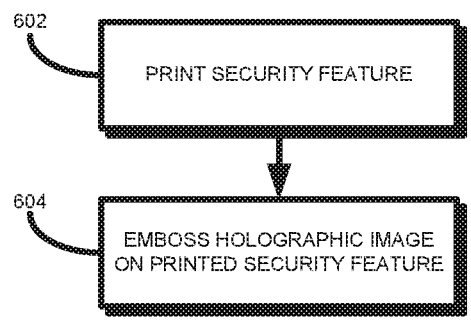
FIG. 6 is a flow diagram showing an outline method of operating a printing system according to one example.

As shown in FIG. 6, the controller 122 controls the printing system 100 to print a security feature (block 602) and to hot emboss a holographic image on the printed security feature (block 604). The controller 122 may control operation of one or both of the printing system 102 and the holographic imaging module 114 such that a holographic image is embossed only on a printed security feature.

Referring now to FIG. 4 there is shown an illustration of a section view of a media 202 on which a holographic image 402 has been formed on a printed security feature 204 by the system 100.

The printed security feature 204 is formed, in this example, of a layer of Hewlett-Packard ElectroInk, or LEP ink. The printed security feature 204 may be in the order of about 1 to 4 microns thick. In the example shown the holographic image 402 is formed on a portion of the printed security feature 204, although in other examples the holographic image 402 may be formed on the whole of the printed security feature 204. The depth to which the holographic image may be embossed may vary depending on the particular characteristics of the holographic master stamp.

Figure 5A:
FIG. 5a is an illustration of a holographic security feature according to one example.

FIG. 5a shows an example of a printed security feature 204 on which a holographic image has been formed, as described above. The holographic image embossed on the printed content is represented by way of dark hatching. It can be seen that since the security code is printed as knock-out text (i.e. no ink is used to print the security code) there is no holographic image on the security code portion of the printed.

Figure 5B:
FIG. 5b is an illustration of a holographic security feature according to one example.

FIG. 5b shows a further example of a printed security feature 204 on which a holographic image has been formed, as described above. Again, the holographic image embossed on the printed content is represented by way of dark hatching. It can be seen that since the security code is printed as knock-out text (i.e. no ink is used to print the security code) there is no holographic image generated on the security code portion of the printed content.

Figure 5C:
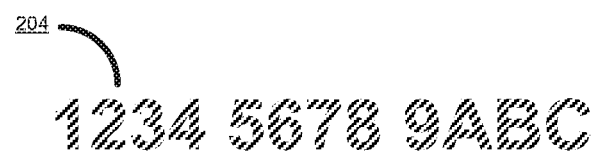
FIG. 5c is an illustration of a holographic security feature according to one example.

FIG. 5c shows a yet further example of a printed security feature 204 on which a holographic image has been formed, as described above. Again, the holographic image embossed on the printed content is represented by way of dark hatching.

Producing holographic images in this way enables unique or substantially unique holographic images to be produced rapidly, cheaply, and in large quantities. This is particularly advantageous since it is generally not feasible, at least economically, to produce large quantities of unique or substantially unique holographic images using conventional techniques. Furthermore, the ability to produce large numbers of unique or substantially unique holographic security features further improves security and reduces the likelihood of counterfeiting.

A yet further advantage is that security features printed using Hewlett-Packard ElectroInk may have a holographic image directly embossed thereon, without requiring any additional post or pre-treatments to be applied thereto, such as additional varnish layers. Accordingly, such a system may be used to produce holographic security features is a cost-effective manner.

Holographic security features generated in this way may be unique. Furthermore, the unique code of a security feature may be used to uniquely identify an item or product, and may be verifiable for example using a web service or web application. Furthermore, since the security code itself incorporates a holographic image, reproduction of the holographic security feature is difficult. Accordingly, security features as described herein may quickly and verified as authentic by simple visual analysis.

Although the above examples have been described with reference to Hewlett-Packard ElectroInk, in other examples other inks and printing techniques may be used. For example, for inks which are not suitably thermo-plastic materials a suitable thermo-plastic layer, such as a post-treatment or varnish, may be applied to a printed security feature such that the security feature may have a holographic image generated thereon. However, such additional steps add to the complexity as well as the cost of generating holographic security features as described herein.

In a further example, the security of security features as described herein may be further enhanced by using the capability of Hewlett-Packard Indigo presses to print high quality text at very small point sizes that is not generally readable with the naked eye. Such text is typically referred to as microtext or microprinting. Although such text is not generally readable with the naked eye, it is generally readable with additional magnification, such as by using a low-powered magnifying glass.

Hewlett-Packard Indigo presses are able to produce high quality text in very small sizes. For example, depending on the font used Hewlett-Packard Indigo presses are able to print text at 1 point (pt) or smaller. This capability is due in part to the high print resolution of the presses, and also to the small ink particle size (around 1 to 2 microns) used in Hewlett-Packard ElectoInk. This capability is shared by very few other variable data printing technologies. Although traditional offset printing techniques may also allow printing of high quality text at small sizes, offset printing techniques are not able to perform variable data printing, where potentially each printed security code is unique or substantially unique.

Accordingly, the inclusion of a printed security feature including variable data microtext and a holographic image embossed thereon as described herein provides a high-security security feature that is difficult to counterfeit and the authenticity of which may be verified by simple visual inspection.

In one example, when generating a security feature that includes a security code using microtext the security code is printed as knock-out or inverted microtext. A holographic image is then embossed on the printed security feature as described above. Advantageously, this enables the microtext to be readable (using appropriate magnification) and enables a holographic image to be formed on the printed ink that forms the knock-out microtext. Such an arrangement is particularly difficult to counterfeit.

Furthermore, it can be assumed with a good degree of confidence that such a security feature has been produced using a Hewlett-Packard Indigo press.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A system for generating visual security features comprising:
   a printing module comprising a rotatable photo imaging plate, a laser imaging unit and a developer;
   a controller to control the printing module to form a security feature on a media, the security feature comprising a field of material, the material printed by the printing module, the security feature surrounding a security code formed on the media, the security code defined by an absence of the material printed inside the field by the printing module;
   a holographic imaging module for embossing a holographic image in the printed material of the field.

2. The system of claim 1, wherein the security feature comprises a unique security code in a text size of 1 point or less.

3. The system of claim 1, wherein the controller is to operate the printing module to form the security feature comprising the field centered on a unique security code.

4. The system of claim 1, wherein the printing module is to form the security feature using a thermo-plastic ink on which a holographic image is directly hot embossable.

5. The system of claim 1, wherein the controller is to operate the printing module to print a series of security features, each security feature comprising a unique security code.

6. The system of claim 1, comprising a media path through which a media on which is printed a security feature is fed to the holographic imaging module.

7. The system of claim 1, wherein the printing module prints security features on a series of adhesive labels, each security feature being unique.

8. A method of generating a visual security feature on a media, the method comprising:
   with a printing system having a media path, printing a security feature using a thermoplastic ink on a media in the media path;
   hot embossing the ink of the security feature to form a holographic image in the thermoplastic ink;
   generating a series of printed security features on the media, each having a unique security code; and
   embossing a holographic image on each of the printed security features.

* * * * *